United States Patent
Roach

(10) Patent No.: US 9,114,866 B1
(45) Date of Patent: Aug. 25, 2015

(54) TUBULAR SUPERPRESSURE BALLOON

(71) Applicant: Google Inc., Mountain View, CA (US)

(72) Inventor: Kevin Roach, Mountain View, CA (US)

(73) Assignee: Google Inc., Mountain View, CA (US)

( * ) Notice: Subject to any disclaimer, the term of this patent is extended or adjusted under 35 U.S.C. 154(b) by 161 days.

(21) Appl. No.: 13/861,280

(22) Filed: Apr. 11, 2013

(51) Int. Cl.
*B64B 1/40* (2006.01)
*B64B 1/58* (2006.01)

(52) U.S. Cl.
CPC .... *B64B 1/40* (2013.01); *B64B 1/58* (2013.01)

(58) Field of Classification Search
CPC .................................... B64B 1/40; B64B 1/58
USPC ................................................ 244/31, 158.3
See application file for complete search history.

(56) References Cited

U.S. PATENT DOCUMENTS

| | | | |
|---|---|---|---|
| 4,420,130 A * | 12/1983 | Regipa | 244/31 |
| 4,434,958 A | 3/1984 | Rougeron et al. | |
| 4,877,205 A | 10/1989 | Rand | |
| 5,104,059 A | 4/1992 | Rand et al. | |
| 5,645,248 A | 7/1997 | Campbell | |
| 5,992,795 A | 11/1999 | Tockert | |
| 6,290,172 B1 | 9/2001 | Yajima et al. | |
| 6,685,136 B2 | 2/2004 | Yajima et al. | |
| 7,469,857 B2 | 12/2008 | Voss | |
| 7,913,948 B2 | 3/2011 | Porter | |
| 2010/0012772 A1 * | 1/2010 | Izutsu et al. | 244/31 |
| 2010/0185346 A1 * | 7/2010 | Surmont | 701/4 |

* cited by examiner

*Primary Examiner* — Brian M O'Hara
*Assistant Examiner* — Michael Kreiner
(74) *Attorney, Agent, or Firm* — McDonnell Boehnen Hulbert & Berghoff LLP

(57) ABSTRACT

A balloon with a generally tubular shaped balloon envelope. The tubular shaped balloon envelope may comprise a number of gores, where each gore is shaped with two elongated edges and two vertices. The vertices of each gore may be located at the top and bottom of the balloon envelope. The gore edges may be sealed together at adjacent edges to seal the balloon such that it is airtight.

12 Claims, 5 Drawing Sheets

TUBULAR SUPERPRESSURE BALLOON

BACKGROUND

Unless otherwise indicated herein, the materials described in this section are not prior art to the claims in this application and are not admitted to be prior art by inclusion in this section.

Superpressure balloons that are capable of reaching high-altitudes and being positioned in the stratosphere are increasingly being used across areas of the world. The conditions in the stratosphere, such as high altitude and increased pressure, expose the high-altitude balloons to difficult conditions, thus challenging the balloon's construction and durability. Therefore, for these and other reasons, the balloons may be built into particular shapes to increase the balloon's ability to reach high altitudes and remain stable in the stratosphere. Accordingly, a high-altitude balloon that is capable of reaching high-altitudes and withstanding increased pressure is desirable.

SUMMARY

In one aspect, an example tubular shaped balloon may include: a number of gores, where each gore has a hexagonal shape with (a) two elongated edges and (b) two vertices, where said gores have a top and a bottom; where the gores are positioned vertically such that the vertices are located at the top and the bottom of the gore; and where the gores are sealed together at adjacent edges to form an airtight tubular envelope.

In another aspect, an example tubular shaped balloon may include: a number of gores, where each gore has a shape with (a) two elongated edges and (b) two vertices, where said gores have a top and a bottom; where the gores are positioned vertically such that the vertices are located at the top and the bottom of the gore; and where the gores are sealed together at adjacent edges to form an airtight tubular envelope.

In a further aspect, an example tubular shaped balloon may include: an envelope, where said envelope comprises a number of gores that are sealed together; and where the envelope has a tubular shape.

In yet a further aspect, an example tubular shaped balloon may include: (i) a number of gores, where each gore has a hexagonal shape with (a) two elongated edges and (b) two vertices, where said gores have a top and a bottom; and (ii) means for positioning the gores vertically such that the vertices are located at the top and bottom of the gore; and (iii) means for sealing the gores together at adjacent edges to form an airtight tubular envelope.

These as well as other aspects, advantages, and alternatives, will become apparent to those of ordinary skill in the art by reading the following detailed description, with reference where appropriate to the accompanying drawings.

DETAILED DESCRIPTION

Figure 1:
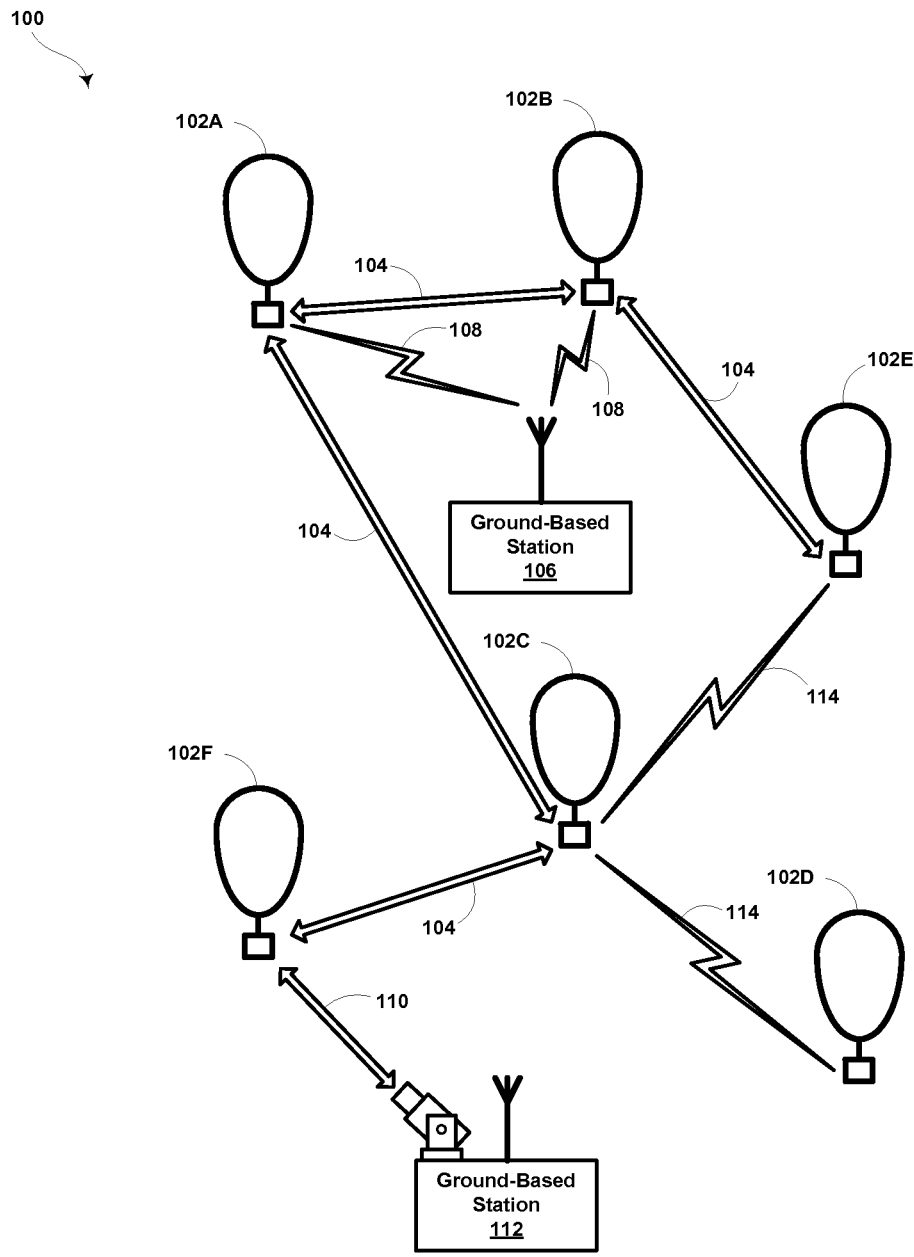
FIG. 1 is a simplified block diagram illustrating a balloon network, according to an example embodiment.

Example methods and systems are described herein. Any example embodiment or feature described herein is not necessarily to be construed as preferred or advantageous over other embodiments or features. The example embodiments described herein are not meant to be limiting. It will be readily understood that certain aspects of the disclosed systems and methods can be arranged and combined in a wide variety of different configurations, all of which are contemplated herein.

Furthermore, the particular arrangements shown in the Figures or otherwise described herein should not be viewed as necessarily limiting. It should be understood that other embodiments may include more or less of each element shown in a given Figure. Further, some of the illustrated elements may be combined or omitted. Yet further, an example embodiment may include elements that are not illustrated in the Figures.

1. Overview

The device described herein may help provide for more durable and inexpensive constructions for the manufacture of a superpressure balloon that is capable of reaching high-altitudes. In particular, a high-altitude, superpressure balloon with a tubular shaped envelope is described. The balloon described herein may include a low-cost tubular envelope that uses straight line seaming for ease of manufacture and is capable of flying at high-altitudes. More specifically, the disclosed tubular design is capable of being increased in size without the need to increase reinforcement of the balloon envelope. Since the absence of need for reinforcement of the balloon envelope reduces the weight of the balloon itself, a superpressure tubular balloon is desired, and therefore disclosed.

The tubular shape of the envelope improves the balloon's ability to hold a greater differential pressure than previously developed spherical, ellipsoidal, or tetrahedral shaped balloon envelopes. The ability to hold a greater pressure increases a balloon's ability to remain in the stratosphere for a longer period of time. Further, the tubular nature of the balloon envelope creates a much easier, streamlined, and cost-effective manufacturing process, in part due to the straight-line seams and symmetrical construction.

As noted, the superpressure balloon may include an envelope that is generally constructed into the shape of a tube. The tubular balloon may be formed into a number of tubed shapes, such as, for example, a cylindrical shape. In order to achieve the tubular shape, a number of gores, which are segments of a three-dimensional shape that are fabricated from a two-dimensional piece of material, may be used. In particular, the gores may be aligned and sealed together such that a three-dimensional tubular shape is formed. Additionally, the gores used to construct the envelope of the tubular balloon may be hexagonally shaped. The size and shape of the gores, however, may vary based on the desired size, shape, and volume of the balloon.

A number of methods may be available for sealing the top and bottom closures of the balloon envelope. With the use of hexagonally shaped gores, triangular formations located at the top and bottom of the balloons come together to form a top and bottom apex. The triangle formations may be sealed together to create a hemispherical shape. Further, a top plate and a base plate may be attached to the balloon envelope to ensure the envelope is airtight. Once this is complete, the tubular envelope may be utilized for a high-altitude, superpressure balloon. Beneficially, the rigidity of the tubular, super-pressure envelope keeps the volume of lift gas in the envelope substantially constant when exposed to changing atmospheric pressure.

It should be understood that the examples discussed above are provided for purposes of example and explanation only and should not be taken to be limiting.

2. Example Balloon Networks

FIG. 1 is a simplified block diagram illustrating a balloon network 100, according to an example embodiment. As shown, balloon network 100 includes balloons 102A to 102F, which are configured to communicate with one another via free-space optical links 104. Balloons 102A to 102F could additionally or alternatively be configured to communicate with one another via RF links 114. Balloons 102A to 102F may collectively function as a mesh network for packet-data communications. Further, at least some of balloons 102A and 102B may be configured for RF communications with ground-based stations 106 and 112 via respective RF links 108. Further, some balloons, such as balloon 102F, could be configured to communicate via optical link 110 with ground-based station 112.

In an example embodiment, balloons 102A to 102F are high-altitude balloons, which are deployed in the stratosphere. At moderate latitudes, the stratosphere includes altitudes between approximately 10 kilometers (km) and 50 km altitude above the surface. At the poles, the stratosphere starts at an altitude of approximately 8 km. In an example embodiment, high-altitude balloons may be generally configured to operate in an altitude range within the stratosphere that has relatively low wind speed (e.g., between 5 and 20 miles per hour (mph)).

More specifically, in a high-altitude-balloon network, balloons 102A to 102F may generally be configured to operate at altitudes between 18 km and 25 km (although other altitudes are possible). This altitude range may be advantageous for several reasons. In particular, this layer of the stratosphere generally has relatively low wind speeds (e.g., winds between 5 and 20 mph) and relatively little turbulence. Further, while the winds between 18 km and 25 km may vary with latitude and by season, the variations may be modeled in a reasonably accurate manner. Additionally, altitudes above 18 km are typically above the maximum flight level designated for commercial air traffic. Therefore, interference with commercial flights is of decreased concern when balloons are deployed between 18 km and 25 km.

To transmit data to another balloon, a given balloon 102A to 102F may be configured to transmit an optical signal via an optical link 104. In an example embodiment, a given balloon 102A to 102F may use one or more high-power light-emitting diodes (LEDs) to transmit an optical signal. Alternatively, some or all of balloons 102A to 102F may include laser systems for free-space optical communications over optical links 104. Other types of free-space optical communication are possible. Further, in order to receive an optical signal from another balloon via an optical link 104, a given balloon 102A to 102F may include one or more optical receivers. Additional details of example balloons are discussed in greater detail below, with reference to FIG. 3.

In a further aspect, balloons 102A to 102F may utilize one or more of various different RF air-interface protocols for communication with ground-based stations 106 and 112 via respective RF links 108. For instance, some or all of balloons 102A to 102F may be configured to communicate with ground-based stations 106 and 112 using protocols described in IEEE 802.11 (including any of the IEEE 802.11 revisions), various cellular protocols such as GSM, CDMA, UMTS, EV-DO, WiMAX, and/or LTE, and/or one or more propriety protocols developed for balloon-ground RF communication, among other possibilities.

In a further aspect, there may be scenarios where RF links 108 do not provide a desired link capacity for balloon-to-ground communications. For instance, increased capacity may be desirable to provide backhaul links from a ground-based gateway, and in other scenarios as well. Accordingly, an example network may also include downlink balloons, which could provide a high-capacity air-ground link.

For example, in balloon network 100, balloon 102F is configured as a downlink balloon. Like other balloons in an example network, a downlink balloon 102F may be operable for optical communication with other balloons via optical links 104. However, a downlink balloon 102F may also be configured for free-space optical communication with a ground-based station 112 via an optical link 110. Optical link 110 may therefore serve as a high-capacity link (as compared to an RF link 108) between the balloon network 100 and the ground-based station 112.

Note that in some implementations, a downlink balloon 102F may additionally be operable for RF communication with ground-based stations 106. In other cases, a downlink balloon 102F may only use an optical link for balloon-to-ground communications. Further, while the arrangement shown in FIG. 1 includes just one downlink balloon 102F, an example balloon network may also include multiple downlink balloons. On the other hand, a balloon network may also be implemented without any downlink balloons.

In other implementations, a downlink balloon may be equipped with a specialized, high-bandwidth RF communication system for balloon-to-ground communications, instead of, or in addition to, a free-space optical communication system. The high-bandwidth RF communication system may take the form of an ultra-wideband system, which may provide an RF link with substantially the same capacity as one of the optical links 104. Other forms are also possible.

Ground-based stations, such as ground-based stations 106 and/or 112, may take various forms. Generally, a ground-based station may include components such as transceivers, transmitters, and/or receivers for communication via RF links and/or optical links with a balloon network. Further, a ground-based station may use various air-interface protocols in order to communicate with a balloon 102A to 102F over an RF link 108. As such, ground-based stations 106 and 112 may be configured as an access point via which various devices can connect to balloon network 100. Ground-based stations 106 and 112 may have other configurations and/or serve other purposes without departing from the scope of the invention.

In a further aspect, some or all of balloons 102A to 102F could be configured to establish a communication link with space-based satellites in addition to, or as an alternative to, a ground-based communication link. In some embodiments, a balloon may communicate with a satellite via an optical link. However, other types of satellite communications are possible.

Further, some ground-based stations, such as ground-based stations 106 and 112, may be configured as gateways between balloon network 100 and one or more other networks. Such ground-based stations 106 and 112 may thus serve as an interface between the balloon network and the Internet, a cellular service provider's network, and/or other types of networks. Variations on this configuration and other configurations of ground-based stations 106 and 112 are also possible.

a. Mesh Network Functionality

As noted, balloons 102A to 102F may collectively function as a mesh network. More specifically, since balloons 102A to 102F may communicate with one another using free-space optical links, the balloons may collectively function as a free-space optical mesh network.

In a mesh-network configuration, each balloon 102A to 102F may function as a node of the mesh network, which is operable to receive data directed to it and to route data to other balloons. As such, data may be routed from a source balloon to a destination balloon by determining an appropriate sequence of optical links between the source balloon and the destination balloon. These optical links may be collectively referred to as a "lightpath" for the connection between the source and destination balloons. Further, each of the optical links may be referred to as a "hop" on the lightpath.

To operate as a mesh network, balloons 102A to 102F may employ various routing techniques and self-healing algorithms. In some embodiments, a balloon network 100 may employ adaptive or dynamic routing, where a lightpath between a source and destination balloon is determined and set-up when the connection is needed, and released at a later time. Further, when adaptive routing is used, the lightpath may be determined dynamically depending upon the current state, past state, and/or predicted state of the balloon network.

In addition, the network topology may change as the balloons 102A to 102F move relative to one another and/or relative to the ground. Accordingly, an example balloon network 100 may apply a mesh protocol to update the state of the network as the topology of the network changes. For example, to address the mobility of the balloons 102A to 102F, balloon network 100 may employ and/or adapt various techniques that are employed in mobile ad hoc networks (MANETs). Other examples are possible as well.

In some implementations, a balloon network 100 may be configured as a transparent mesh network. More specifically, in a transparent balloon mesh network, the balloons may include components for physical switching that is entirely optical, without any electrical components involved in the physical routing of optical signals. Thus, in a transparent configuration with optical switching, signals travel through a multi-hop lightpath that is entirely optical.

In other implementations, the balloon network 100 may implement a free-space optical mesh network that is opaque. In an opaque configuration, some or all balloons 102A to 102F may implement optical-electrical-optical (OEO) switching. For example, some or all balloons may include optical cross-connects (OXCs) for OEO conversion of optical signals. Other opaque configurations are also possible. Additionally, network configurations are possible that include routing paths with both transparent and opaque sections.

In a further aspect, balloons in an example balloon network 100 may implement wavelength division multiplexing (WDM), which may help to increase link capacity. When WDM is implemented with transparent switching, physical lightpaths through the balloon network may be subject to the "wavelength continuity constraint." More specifically, because the switching in a transparent network is entirely optical, it may be necessary to assign the same wavelength for all optical links on a given lightpath.

An opaque configuration, on the other hand, may avoid the wavelength continuity constraint. In particular, balloons in an opaque balloon network may include the OEO switching systems operable for wavelength conversion. As a result, balloons can convert the wavelength of an optical signal at each hop along a lightpath. Alternatively, optical wavelength conversion could take place at only selected hops along the lightpath.

Further, various routing algorithms may be employed in an opaque configuration. For example, to determine a primary lightpath and/or one or more diverse backup lightpaths for a given connection, example balloons may apply or consider shortest-path routing techniques such as Dijkstra's algorithm and k-shortest path, and/or edge and node-diverse or disjoint routing such as Suurballe's algorithm, among others. Additionally or alternatively, techniques for maintaining a particular quality of service (QoS) may be employed when determining a lightpath. Other techniques are also possible.

b. Station-Keeping Functionality

In an example embodiment, a balloon network 100 may implement station-keeping functions to help provide a desired network topology. For example, station-keeping may involve each balloon 102A to 102F maintaining and/or moving into a certain position relative to one or more other balloons in the network (and possibly in a certain position relative to the ground). As part of this process, each balloon 102A to 102F may implement station-keeping functions to determine its desired positioning within the desired topology, and if necessary, to determine how to move to the desired position.

In an example embodiment, station-keeping functionality may involve balloons moving relative to the ground such that a desired population and/or general spacing may be maintained in a given area, even as the particular balloons that serve the area change. For example, balloons may move out of an area, while other balloons move into the same area. Accordingly, station-keeping functionality may focus on maintaining a desired topology, without necessarily requiring that certain balloons stay at certain locations.

The desired topology may vary depending upon the particular implementation. In some cases, balloons may implement station-keeping to provide a substantially uniform topology. In such cases, a given balloon 102A to 102F may implement station-keeping functions to position itself at substantially the same distance (or within a certain range of distances) from adjacent balloons in the balloon network 100.

In other cases, a balloon network 100 may have a non-uniform topology. For instance, example embodiments may involve topologies where balloons are distributed more or less densely in certain areas, for various reasons. As an example, to help meet the higher bandwidth demands that are typical in urban areas, balloons may be clustered more densely over urban areas. For similar reasons, the distribution of balloons may be denser over land than over large bodies of water. Many other examples of non-uniform topologies are possible.

In a further aspect, the topology of an example balloon network may be adaptable. In particular, station-keeping functionality of example balloons may allow the balloons to adjust their respective positioning in accordance with a change in the desired topology of the network. For example, one or more balloons could move to new positions to increase or decrease the density of balloons in a given area. Other examples are possible.

In some embodiments, a balloon network 100 may employ an energy function to determine if and/or how balloons should move to provide a desired topology. In particular, the state of a given balloon and the states of some or all nearby balloons may be input to an energy function. The energy function may apply the current states of the given balloon and the nearby balloons to a desired network state (e.g., a state corresponding to the desired topology). A vector indicating a desired movement of the given balloon may then be determined by determining the gradient of the energy function.

The given balloon may then determine appropriate actions to take in order to effectuate the desired movement. For example, a balloon may determine an altitude adjustment or adjustments such that winds will move the balloon in the desired manner.

c. Control of Balloons in a Balloon Network

Figure 2:
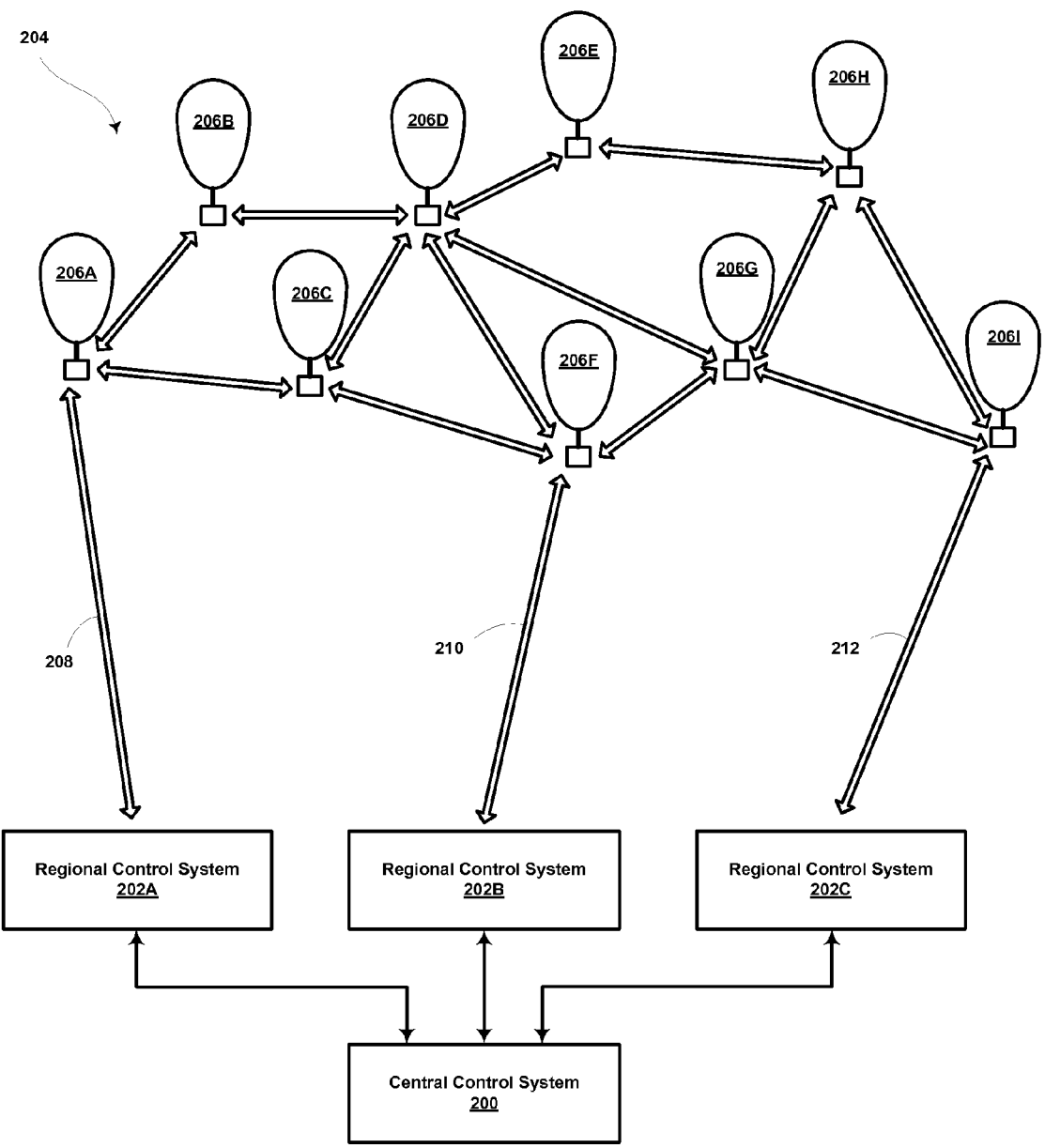
FIG. 2 is a simplified block diagram illustrating a balloon-network control system, according to an example embodiment.

In some embodiments, mesh networking and/or station-keeping functions may be centralized. For example, FIG. 2 is a block diagram illustrating a balloon-network control system, according to an example embodiment. In particular, FIG. 2 shows a distributed control system, which includes a central control system 200 and a number of regional control-systems 202A to 202B. Such a control system may be configured to coordinate certain functionality for balloon network 204, and as such, may be configured to control and/or coordinate certain functions for balloons 206A to 206I.

In the illustrated embodiment, central control system 200 may be configured to communicate with balloons 206A to 206I via a number of regional control systems 202A to 202C. These regional control systems 202A to 202C may be configured to receive communications and/or aggregate data from balloons in the respective geographic areas that they cover, and to relay the communications and/or data to central control system 200. Further, regional control systems 202A to 202C may be configured to route communications from central control system 200 to the balloons in their respective geographic areas. For instance, as shown in FIG. 2, regional control system 202A may relay communications and/or data between balloons 206A to 206C and central control system 200, regional control system 202B may relay communications and/or data between balloons 206D to 206F and central control system 200, and regional control system 202C may relay communications and/or data between balloons 206G to 206I and central control system 200.

In order to facilitate communications between the central control system 200 and balloons 206A to 206I, certain balloons may be configured as downlink balloons, which are operable to communicate with regional control systems 202A to 202C. Accordingly, each regional control system 202A to 202C may be configured to communicate with the downlink balloon or balloons in the respective geographic area it covers. For example, in the illustrated embodiment, balloons 206A, 206F, and 206I are configured as downlink balloons. As such, regional control systems 202A to 202C may respectively communicate with balloons 206A, 206F, and 206I via optical links 206, 208, and 210, respectively.

In the illustrated configuration, only some of balloons 206A to 206I are configured as downlink balloons. The balloons 206A, 206F, and 206I that are configured as downlink balloons may relay communications from central control system 200 to other balloons in the balloon network, such as balloons 206B to 206E, 206G, and 206H. However, it should be understood that in some implementations, it is possible that all balloons may function as downlink balloons. Further, while FIG. 2 shows multiple balloons configured as downlink balloons, it is also possible for a balloon network to include only one downlink balloon, or possibly even no downlink balloons.

Note that a regional control system 202A to 202C may in fact just be a particular type of ground-based station that is configured to communicate with downlink balloons (e.g., such as ground-based station 112 of FIG. 1). Thus, while not shown in FIG. 2, a control system may be implemented in conjunction with other types of ground-based stations (e.g., access points, gateways, etc.).

In a centralized control arrangement, such as that shown in FIG. 2, the central control system 200 (and possibly regional control systems 202A to 202C as well) may coordinate certain mesh-networking functions for balloon network 204. For example, balloons 206A to 206I may send the central control system 200 certain state information, which the central control system 200 may utilize to determine the state of balloon network 204. The state information from a given balloon may include location data, optical-link information (e.g., the identity of other balloons with which the balloon has established an optical link, the bandwidth of the link, wavelength usage and/or availability on a link, etc.), wind data collected by the balloon, and/or other types of information. Accordingly, the central control system 200 may aggregate state information from some or all of the balloons 206A to 206I in order to determine an overall state of the network.

The overall state of the network may then be used to coordinate and/or facilitate certain mesh-networking functions such as determining lightpaths for connections. For example, the central control system 200 may determine a current topology based on the aggregate state information from some or all of the balloons 206A to 206I. The topology may provide a picture of the current optical links that are available in balloon network and/or the wavelength availability on the links. This topology may then be sent to some or all of the balloons so that a routing technique may be employed to select appropriate lightpaths (and possibly backup lightpaths) for communications through the balloon network 204.

In a further aspect, the central control system 200 (and possibly regional control systems 202A to 202C as well) may also coordinate certain station-keeping functions for balloon network 204. For example, the central control system 200 may input state information that is received from balloons 206A to 206I to an energy function, which may effectively compare the current topology of the network to a desired topology, and provide a vector indicating a direction of movement (if any) for each balloon, such that the balloons can move towards the desired topology. Further, the central control system 200 may use altitudinal wind data to determine respective altitude adjustments that may be initiated to achieve the movement towards the desired topology. The central control system 200 may provide and/or support other station-keeping functions as well.

FIG. 2 shows a distributed arrangement that provides centralized control, with regional control systems 202A to 202C coordinating communications between a central control system 200 and a balloon network 204. Such an arrangement may be useful to provide centralized control for a balloon network that covers a large geographic area. In some embodiments, a distributed arrangement may even support a global balloon network that provides coverage everywhere on earth. Of course, a distributed-control arrangement may be useful in other scenarios as well.

Further, it should be understood that other control-system arrangements are also possible. For instance, some implementations may involve a centralized control system with additional layers (e.g., sub-region systems within the regional control systems, and so on). Alternatively, control functions may be provided by a single, centralized, control system, which communicates directly with one or more downlink balloons.

In some embodiments, control and coordination of a balloon network may be shared by a ground-based control system and a balloon network to varying degrees, depending upon the implementation. In fact, in some embodiments, there may be no ground-based control systems. In such an embodiment, all network control and coordination functions may be implemented by the balloon network itself. For example, certain balloons may be configured to provide the same or similar functions as central control system 200 and/or regional control systems 202A to 202C. Other examples are also possible.

Furthermore, control and/or coordination of a balloon network may be de-centralized. For example, each balloon may relay state information to, and receive state information from, some or all nearby balloons. Further, each balloon may relay state information that it receives from a nearby balloon to some or all nearby balloons. When all balloons do so, each balloon may be able to individually determine the state of the network. Alternatively, certain balloons may be designated to aggregate state information for a given portion of the network. These balloons may then coordinate with one another to determine the overall state of the network.

Further, in some aspects, control of a balloon network may be partially or entirely localized, such that it is not dependent on the overall state of the network. For example, individual balloons may implement station-keeping functions that only consider nearby balloons. In particular, each balloon may implement an energy function that takes into account its own state and the states of nearby balloons. The energy function may be used to maintain and/or move to a desired position with respect to the nearby balloons, without necessarily considering the desired topology of the network as a whole. However, when each balloon implements such an energy function for station-keeping, the balloon network as a whole may maintain and/or move towards the desired topology.

As an example, each balloon A may receive distance information $d_1$ to $d_k$ with respect to each of its k closest neighbors. Each balloon A may treat the distance to each of the k balloons as a virtual spring with vector representing a force direction from the first nearest neighbor balloon i toward balloon A and with force magnitude proportional to $d_i$. The balloon A may sum each of the k vectors and the summed vector is the vector of desired movement for balloon A. Balloon A may attempt to achieve the desired movement by controlling its altitude.

Alternatively, this process could assign the force magnitude of each of these virtual forces equal to $d_i \times d_i$, wherein $d_i$ is proportional to the distance to the second nearest neighbor balloon, for instance. Other algorithms for assigning force magnitudes for respective balloons in a mesh network are possible.

In another embodiment, a similar process could be carried out for each of the k balloons and each balloon could transmit its planned movement vector to its local neighbors. Further rounds of refinement to each balloon's planned movement vector can be made based on the corresponding planned movement vectors of its neighbors. It will be evident to those skilled in the art that other algorithms could be implemented in a balloon network in an effort to maintain a set of balloon spacings and/or a specific network capacity level over a given geographic location.

d. Example Balloon Configuration

Figure 3:
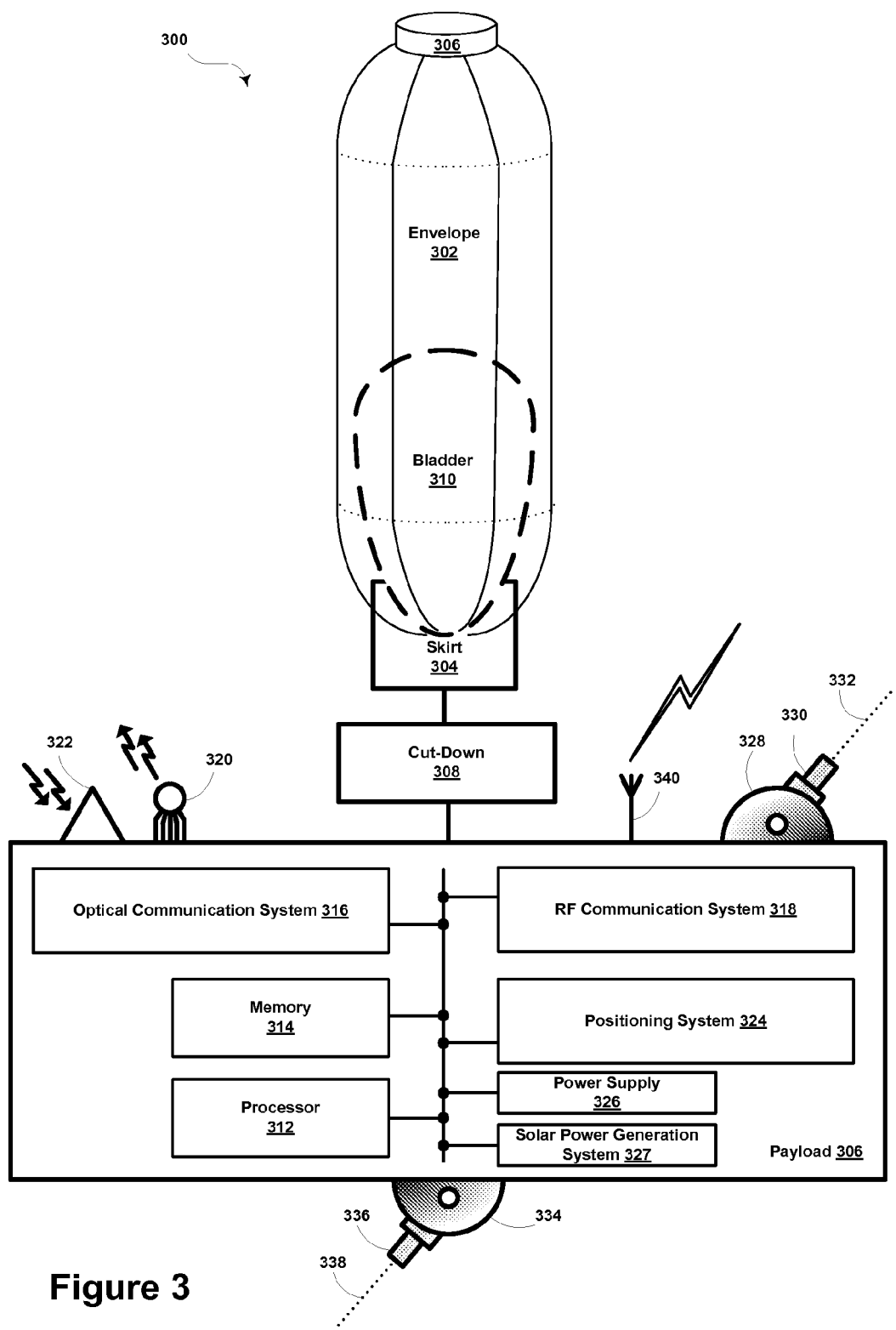
FIG. 3 is a simplified block diagram illustrating a high-altitude balloon, according to an example embodiment.

Various types of balloon systems may be incorporated in an example balloon network. An example balloon network may include all superpressure balloons. Alternatively, the example balloon network may include only some superpressure balloons. One or more other types of balloons that vary in shape, size, design, and/or function may be possible as well. As noted above, an example embodiment may utilize high-altitude balloons, which could typically operate in an altitude range between 18 km and 25 km (the high-altitude balloons may operate in other altitude ranges as well). FIG. 3 shows a high-altitude balloon 300, according to an example embodiment. As shown, the balloon 300 includes an envelope 302, a skirt 304, a payload 306, which may be located at the top and/or bottom of the envelope 302, and a cut-down system 308, which is attached between the balloon 302 and payload 304.

The envelope 302 and skirt 304 may take various forms, which may be currently well-known or yet to be developed. For instance, the envelope 302 and/or skirt 304 may be made of materials including polyethylene, metalized Mylar or biaxially-oriented polyethylene terephthalate ("BoPet"). Additionally or alternatively, some or all of the envelope 302 and/or skirt 304 may be constructed from a highly-flexible latex material, a rubber material such as chloroprene, or polyethylene. Other materials are also possible. Further, the shape and size of the envelope 302 and skirt 304 may vary depending upon the particular implementation. Additionally, the envelope 302 may be filled with various different types of gases, such as helium and/or hydrogen. Other types of gases are possible as well.

The payload 306 of balloon 300 may include a processor 312 and on-board data storage, such as memory 314. The memory 314 may take the form of or include a non-transitory computer-readable medium. The non-transitory computer-readable medium may have instructions stored thereon, which may be accessed and executed by the processor 312 in order to carry out the balloon functions described herein. Thus, processor 312, in conjunction with instructions stored in memory 314, and/or other components, may function as a controller of balloon 300.

The payload 306 of balloon 300 may also include various other types of equipment and systems to provide a number of different functions. For example, payload 306 may include an optical communication system 316, which may transmit optical signals via an ultra-bright LED system 320, and which may receive optical signals via an optical-communication receiver 322 (e.g., a photodiode receiver system). Further, payload 306 may include an RF communication system 318, which may transmit and/or receive RF communications via an antenna system 340.

The payload 306 may also include a power supply 326 to supply power to the various components of balloon 300. The power supply 326 could include a rechargeable battery. In other embodiments, the power supply 326 may additionally or alternatively represent other means known in the art for producing power. In addition, the balloon 300 may include a solar power generation system 327. The solar power generation system 327 may include solar panels and could be used to generate power that charges and/or is distributed by the power supply 326.

The payload 306 may additionally include a positioning system 324. The positioning system 324 could include, for example, a global positioning system (GPS), an inertial navigation system, and/or a star-tracking system. The positioning system 324 may additionally or alternatively include various motion sensors (e.g., accelerometers, magnetometers, gyroscopes, and/or compasses).

The positioning system 324 may additionally or alternatively include one or more video and/or still cameras, and/or various sensors for capturing environmental data.

Some or all of the components and systems within payload 306 may be implemented in a radiosonde or other probe, which may be operable to measure, e.g., pressure, altitude, geographical position (latitude and longitude), temperature, relative humidity, and/or wind speed and/or wind direction, among other information.

As noted, balloon 300 includes an ultra-bright LED system 320 for free-space optical communication with other balloons. As such, optical communication system 316 may be configured to transmit a free-space optical signal by modulating the ultra-bright LED system 320. The optical communication system 316 may be implemented with mechanical systems and/or with hardware, firmware, and/or software. Generally, the manner in which an optical communication system is implemented may vary, depending upon the particular application. The optical communication system 316 and other associated components are described in further detail below.

In a further aspect, balloon 300 may be configured for altitude control. For instance, balloon 300 may include a variable buoyancy system, which is configured to change the altitude of the balloon 300 by adjusting the volume and/or density of the gas in the balloon 300. A variable buoyancy system may take various forms, and may generally be any system that can change the volume and/or density of gas in the envelope 302.

In an example embodiment, a variable buoyancy system may include a bladder 310 that is located inside of envelope 302. The bladder 310 could be an elastic chamber configured to hold liquid and/or gas. Alternatively, the bladder 310 need not be inside the envelope 302. For instance, the bladder 310 could be a rigid bladder that could be pressurized well beyond neutral pressure. The buoyancy of the balloon 300 may therefore be adjusted by changing the density and/or volume of the gas in bladder 310. To change the density in bladder 310, balloon 300 may be configured with systems and/or mechanisms for heating and/or cooling the gas in bladder 310. Further, to change the volume, balloon 300 may include pumps or other features for adding gas to and/or removing gas from bladder 310. Additionally or alternatively, to change the volume of bladder 310, balloon 300 may include release valves or other features that are controllable to allow gas to escape from bladder 310. Multiple bladders 310 could be implemented within the scope of this disclosure. For instance, multiple bladders could be used to improve balloon stability.

In an example embodiment, the envelope 302 could be filled with helium, hydrogen or other lighter-than-air material. The envelope 302 could thus have an associated upward buoyancy force. In such an embodiment, air in the bladder 310 could be considered a ballast tank that may have an associated downward ballast force. In another example embodiment, the amount of air in the bladder 310 could be changed by pumping air (e.g., with an air compressor) into and out of the bladder 310. By adjusting the amount of air in the bladder 310, the ballast force may be controlled. In some embodiments, the ballast force may be used, in part, to counteract the buoyancy force and/or to provide altitude stability.

In other embodiments, the envelope 302 could be substantially rigid and include an enclosed volume. Air could be evacuated from envelope 302 while the enclosed volume is substantially maintained. In other words, at least a partial vacuum could be created and maintained within the enclosed volume. Thus, the envelope 302 and the enclosed volume could become lighter than air and provide a buoyancy force. In yet other embodiments, air or another material could be controllably introduced into the partial vacuum of the enclosed volume in an effort to adjust the overall buoyancy force and/or to provide altitude control.

In another embodiment, a portion of the envelope 302 could be a first color (e.g., black) and/or a first material from the rest of envelope 302, which may have a second color (e.g., white) and/or a second material. For instance, the first color and/or first material could be configured to absorb a relatively larger amount of solar energy than the second color and/or second material. Thus, rotating the balloon such that the first material is facing the sun may act to heat the envelope 302 as well as the gas inside the envelope 302. In this way, the buoyancy force of the envelope 302 may increase. By rotating the balloon such that the second material is facing the sun, the temperature of gas inside the envelope 302 may decrease. Accordingly, the buoyancy force may decrease. In this manner, the buoyancy force of the balloon could be adjusted by changing the temperature/volume of gas inside the envelope 302 using solar energy. In such embodiments, it is possible that a bladder 310 may not be a necessary element of balloon 300. Thus, in various contemplated embodiments, altitude control of balloon 300 could be achieved, at least in part, by adjusting the rotation of the balloon with respect to the sun.

Further, a balloon 300 may include a navigation system (not shown). The navigation system may implement station-keeping functions to maintain position within and/or move to a position in accordance with a desired topology. In particular, the navigation system may use altitudinal wind data to determine altitudinal adjustments that result in the wind carrying the balloon in a desired direction and/or to a desired location. The altitude-control system may then make adjustments to the density of the balloon chamber in order to effectuate the determined altitudinal adjustments and cause the balloon to move laterally to the desired direction and/or to the desired location. Alternatively, the altitudinal adjustments may be computed by a ground-based or satellite-based control system and communicated to the high-altitude balloon. In other embodiments, specific balloons in a heterogeneous balloon network may be configured to compute altitudinal adjustments for other balloons and transmit the adjustment commands to those other balloons.

Additionally, a balloon 300 may include a location-determination system (not shown) for determining the location of a balloon. The location determination system may be configured to determine the landing location of a balloon that has been configured to operate as a node in a balloon network.

As shown, the balloon 300 also includes a cut-down system 308. The cut-down system 308 may be activated to separate the payload 306 from the rest of balloon 300. The cut-down system 308 could include at least a connector, such as a balloon cord, connecting the payload 306 to the envelope 302 and a means for severing the connector (e.g., a shearing mechanism or an explosive bolt). In an example embodiment, the balloon cord, which may be nylon, is wrapped with a nichrome wire. A current could be passed through the nichrome wire to heat it and melt the cord, cutting the payload 306 away from the envelope 302.

The cut-down functionality may be utilized anytime the payload needs to be accessed on the ground, such as when it is time to remove balloon 300 from a balloon network, when maintenance is due on systems within payload 306, and/or when power supply 326 needs to be recharged or replaced.

In an alternative arrangement, a balloon may not include a cut-down system. In such an arrangement, the navigation system may be operable to navigate the balloon to a landing location, in the event the balloon needs to be removed from the network and/or accessed on the ground. Further, it is possible that a balloon may be self-sustaining, such that it does not need to be accessed on the ground. In yet other embodiments, in-flight balloons may be serviced by specific service balloons or another type of service aerostat or service aircraft.

Further, the balloon 300 may include a control system, which may correspond to a processor 312. The control system may be configured to detect a removal event corresponding to a balloon ceasing to operate as a node in the balloon network and the balloon descending to the landing location, as further discussed below. Additionally, in response to detecting the removal event, the control system may be configured to initiate transmission of a recovery-assistance signal, where the recovery-assistance signal comprises the location data corresponding to the landing location of the balloon and an indication of an incentive to recover the balloon. The control system is further discussed below.

e. Example Tubular Balloon Configuration

Figure 4:
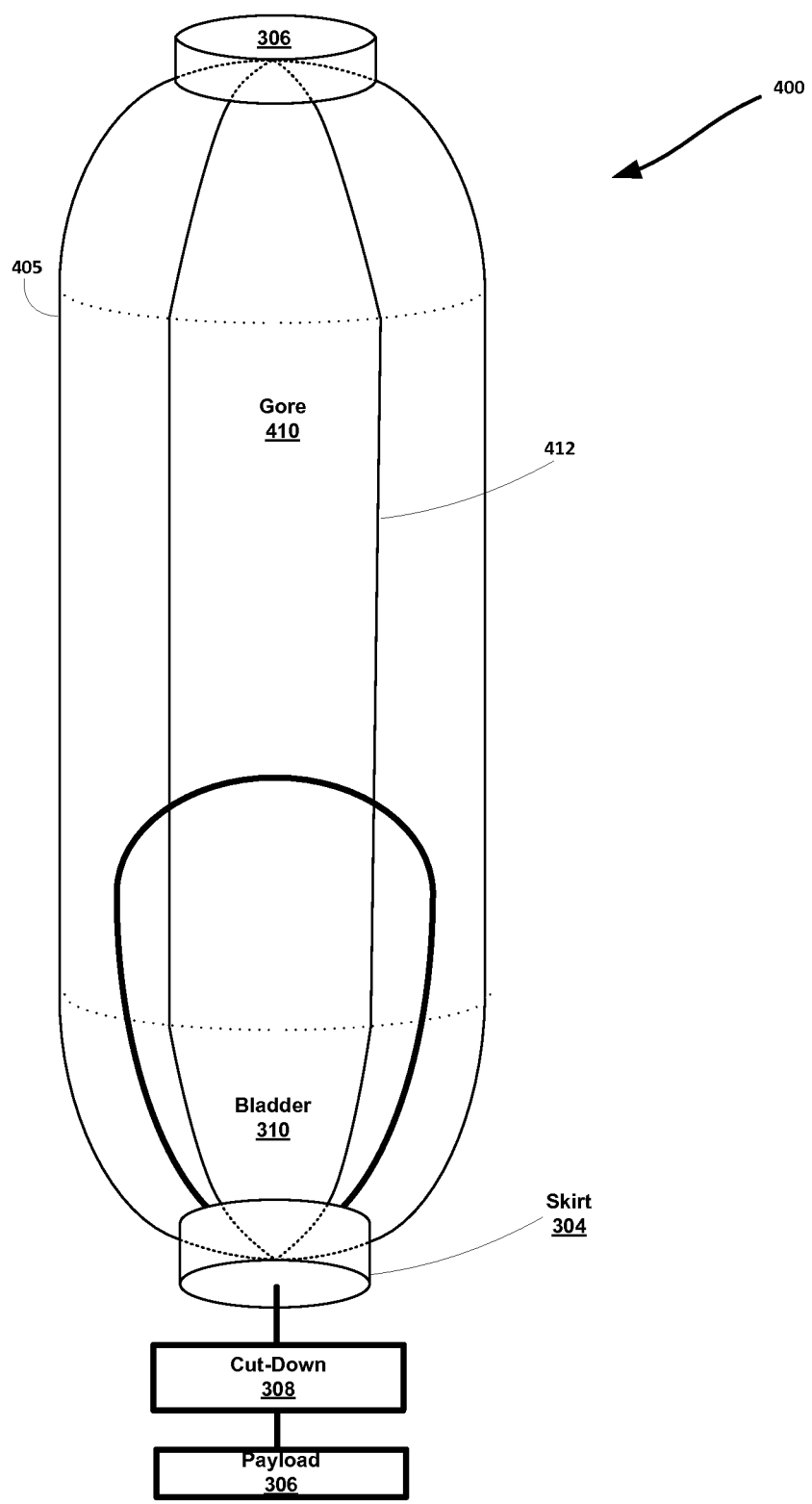
FIG. 4 is a simplified block diagram illustrating a high-altitude balloon, according to an example embodiment.

FIG. 4 is a perspective view of a superpressure balloon 400, which is generally tubular shaped, according to an example embodiment. As shown, balloon 400 may include an envelope 405, which is fabricated from a number of gores 410, each gore containing a number of gore edges 412. The balloon 400 may also include a top or bottom payload 306, a skirt 304, a cutdown system 308, and a bladder 310.

As illustrated in FIG. 4, the balloon 400 has a tubular shape. In one example, the tubular shaped envelope may take the form of a generally cylindrical balloon envelope. Other tubular shapes may be possible as well. The tubular shaped envelope may be the result of fabrication of the envelope 405 using a predetermined number of gores 410. Each gore may extend from the base of the envelope to the crown, and may be made of a number of smaller panels. The gores of a balloon may be fabricated from a two-dimensional material, such as those described below. The gores may then be connected to one another in order to create a three-dimensional, airtight envelope.

Specifically, the gores 410 may be connected, or sealed together, to provide structure and shape to the tubular balloon 400. In order to connect the gores 410, the gore edges 412 of each gore 410 may be connected to corresponding, adjacent gores edges 412 until the desired shape and size of the balloon is met.

Balloons may be produced in many different sizes or volumes. For example, a balloon 400 may be sized such that it is capable of carrying only the weight of its structure. In an alternative embodiment, the balloon 400 may be sized such that it is capable of carrying a 5-10 kg payload. Regardless, the number of different sizes and volumes is limitless.

The balloon 400 may have predetermined dimensions that may include a height, a width, a volume, and a circumference. Other dimensions may exist as well. The length of these dimensions may vary depending on the desired size of the balloon 400. In particular, the dimensions of the balloon 400 may vary based on the number of gores 410 and size of the gores 400 used to fabricate the balloon envelope 405. The number of gores 410 used to construct the balloon envelope 405 may vary. In one embodiment, the balloon envelope is constructed out of at least one gore 410. In an alternative embodiment, the balloon envelope is constructed out of two or more gores 410. Any number of gores 410 may be possible.

As one specific example, a balloon may have a height of 100 feet and a circumference of 25 feet, which may be the result of adjoining 5 gores that have a height of 100 feet and a width of 5 feet. Alternatively, a balloon may have a height of 100 feet and a circumference of 25 feet, but may be the result of adjoining 10 gores that have a height of 10 feet and a width of 2.5 feet. As such, the volume of each balloon may be substantially the same; while the number of gores and/or size of the gores may vary. Other examples may exist as well.

In order to maintain the behavior of the balloon 400 as a pressure cylinder, the ratio of the height to circumference of the balloon envelope 405 may vary. In one embodiment, a ratio of 2.5:1 length to circumference of the balloon envelope 405 is desired. Other ratios may exist as well, including a 3:1 height to circumference ratio or a 4:1 height to circumference ratio of the balloon envelope 405. Other height to circumference ratios may be possible as well. These ratios may be advantageous for various reasons. In particular, in order for the balloon envelope 405 to hold sufficient pressure for the tubular shape, a lengthened height relative to the circumference of the envelope is desired. Lengthened heights, however, may result in poorer surface area to volume ratio, just worsening the balloons performance in high altitudes. Therefore, the balloon envelope 405 may be constructed to hold a maximum amount of pressure relative to the ratio of the height to circumference of the balloon envelope.

As noted above, the tubular shape of the balloon 400 is the result of fabrication of the envelope 405 using a number of gores. The gores 410 may be constructed into any of a number of shapes. In an example embodiment, the gores 410 may be hexagonally shaped, as illustrated in FIG. 4. Other possible shapes include, but are not limited to: a square, a rectangle, a circle, an oval, a triangle, an octagon, a heptagon, a pentagon, or a crescent. Other shapes may be possible as well.

The gores 410 may be of a certain height and width, which may vary depending on the desired volume of the balloon 400. In an example embodiment, the height of the gores may range from approximately 80 feet to 145 feet. Additionally, the width of the gores 410 may range from approximately 4 feet to 8 feet. Other sizes may be possible as well.

The height of the gores 410 may correspond to the vertical length of the height of the balloon envelope 405. Accordingly, the width of the gore 410 may correspond to the circumference of the balloon envelope 405. In one embodiment, the height of the gores 410 may be greater than the width of the gores 410. For example, the height and width of the gores may maintain a minimum height to width ratio of 4:1, respectively. Other ratios may include, but are not limited to, 2.5:1 or 3:1. In an alternative embodiment, the width of the gores may be greater than the height of the gore 410. In yet another embodiment, the height and width of the gores 410 may be the same.

As illustrated in FIG. 4, the gores 410 may include a number of gore edges 412. The number of gore edges 412 on each gore may be dependent on the shape of the gore 410. For example, as illustrated in FIG. 4, a hexagonally shaped gore 410 may include six gore edges 412. Alternatively, a rectangular gore may include four gore edges 412.

Additionally, the gore edges 412 may be any of a number of lengths. In one embodiment, the gore edges 412 may be equal lengths. In yet another embodiment, opposing gore edges 412 may be equal lengths, but differ from other gore edges 412 included on the gore 410. For example, in one embodiment, a hexagonally shaped gore may include two elongated gore edges 412, in addition to a top apex and a bottom apex. In this embodiment, the elongated gore edges 412 are longer than the gore edges 412 that comprise the top or bottom apex. Elongation of a portion of the gore edges 412 may increase the size of the balloon 410. In one embodiment, the gore edges 412 may be straight, such as with a hexagonally shaped gore. In yet another embodiment, the gore edges 412 may be curved, such as with a circular shaped gore.

The gores 410 may be fabricated from any of a number of different materials. Due to the nature of the balloon 400, a lightweight, weather resistant, material may be used to manufacture the gores 410. In one embodiment, the gores 410 may be manufactured out of a stretched polyester film, otherwise known as biaxially-oriented polyethylene terephthalate (BoPET) or biaxially-oriented polyester (OPET). A common commercial brand of BoPET is known as Mylar®. BoPET, in particular, is a desirable material due to its gas barrier properties. Additionally, the material may provide structure to a balloon envelope 405. Further, the material may act as an electric insulator, retain chemical stability, and possess high tensile strength. The thickness, or "mils," of BoPET used for the construction of the balloon may vary. Other possible materials for gore fabrication include, but are not limited to, nylon, latex, or ethylene vinyl alcohol (EVOH).

In an example embodiment, the material chosen to fabricate the gores 410 may be treated with weather or UV resistant materials. Treatment of the materials may increase the longevity and durability of the material. In an example embodiment, the material chosen to fabricate the gores 410, such as Mylar, is corona treated. Corona treatment may be applied to one side of the material in order to protect the material from exposure to harsh conditions.

Hoop stress on the tubular balloon 400 may affect the structure and durability of the gore material. Therefore, hoop stress of the balloon envelope 405 may be kept within the tolerances of the material with a predetermined or known safety margin. In particular, the gore material may be pre-stressed either prior to fabrication of the envelope 405 or following fabrication of the envelope 405. Pre-stressing may occur in a variety of ways. For example, in one embodiment, pre-stressing may occur by pressurizing the balloon 400 prior to launch. In an alternative embodiment, the pre-stressing may occur by limiting the rate at which the balloon 100 reaches the superpressure transition while at altitude using a helium bleed-off valve. Other methods of pre-stressing the balloon material may be possible as well.

The gores 410 may be formed in a number of different ways. For example, in an example embodiment, the gores 410 may be cut from a flat material, such as one of the materials discussed above. Cutting the gore may include the use of scissors, laser cutters, utility blades, or other objects capable of cutting material.

Construction of the main body of the balloon envelope 405 may occur by aligning two gores 410 next to one another such that they are adjacent. The gores 410 may be positioned next to adjacent gores 410 such that one or more of the gore edges 412 of a single gore overlaps with one or more of the edges 412 of the adjacent gore 410. Alternatively, the gore edges 412 may be positioned next to one another such that the edges merely touch. In yet another embodiment, the gores 410 may be positioned next to one another such that a space exists between the gore edges. In one embodiment, the main body of the envelope is constructed with a straight run. Alternatively, it may also be possible to seal the envelope using a curved run.

In order to seal the gore edges 412 along the main body of the envelope 105, such that the balloon envelope 405 is airtight, several methods may be used. In one embodiment, the seams between the gore edges 412 may be stitched together. In another embodiment, the seams between the gore edges 412 may be sealed together. For example, straight-run seaming may be used. In particular, the seams between the gore edges 412 may be sealed with a butt joint and a strength member that runs up the outside of the envelope 405. The strength member may be heat sealed into the seam in order to distribute the weight of the payload that may be carried by the balloon 400. Additional means of support may be applied to the seams.

When the desired number of adjacent gores 410 are aligned and sealed together, the main body of the tubular envelope 405 may be completed. In particular, the first gore edge 412 and last gore edge 412 may be sealed together to create the tubular shape of the balloon envelope 405. In one example, the tubular shape of the balloon may be cylindrical.

There are a number of different methods available to seal the top apex and bottom apex of the gores 410 to create a top and bottom closure. The possible methods include, but are not limited to, parallel straight-line seals, orthogonal straight-line seals, hemispherical approximation by triangles, which includes a circular mount at the base, or hemispherical approximation by straight-line approximation of a curve. Further, the shape of the top and bottom closures may be determined by the chosen method.

Additionally, a combination of the aforementioned sealing methods described above may be used to seal the top apex and bottom apex. For example, a combination of hemispherical approximation by triangles, with a circular mount at the base, with parallel straight-line seals, is illustrated in FIG. 4. As can be seen in FIG. 4, the hexagonally shaped gores 410 create triangular formations at the top apex and bottom apex of the balloon envelope. The gore edges 412 along the triangular formations may be sealed together to further seal the balloon envelope 405. When sealed together using hemispherical approximation, the top and bottom closures are formed into a hemispherical shape. In an alternative embodiment, the closures may be formed into a cone shape. Other shapes may be possible as well.

Once the gore edges 412 on the top apex and bottom apex of the balloon envelope 405 are sealed, a top closure and bottom closure may be added to further seal the balloon. In one embodiment, the top closure may take the form of a top valve and may be mounted opposite of the bottom closure. The top valve, which is similar to a pressure release valve, may include an opening with a predetermined diameter. The valve may act to release pressure, in addition to maintain a seal against a pressure differential. Additionally, the bottom closure may take the form of a base plate. The base plate may include hard plates that are mounted into the envelope base.

During construction of the balloon envelope 405, corners may be formed based on the selected shape of the gores 410. These corners, if not reinforced, may act as a weak point on the balloon envelope 405. As such, the corners may be reinforced using a variety of reinforcement methods. In one embodiment, the corners of the balloon envelope 405 may be reinforced using a second heat seal.

Once the balloon envelope 405 is airtight, it may be filled with gaseous materials. The gaseous materials aid the flight of the balloon and allow it to enter the stratosphere. An example of a possible gaseous material includes helium. Other gaseous materials may be possible as well.

Additional support may be included on the balloon through the addition of reinforcement tape. In particular, Mylar heat sealable tape may be used in conjunction with a fiberglass load tape to improve the balloon's ability to withstand the pressure experienced in the stratosphere.

Balloons may be used to construct a balloon network within the stratosphere. As such, balloons may be sized to carry different amounts of weighted equipment or other materials. In order to carry equipment or other materials, balloon 400 may include a top payload 306, a bottom payload 306, and a cutdown system 308. For example, a balloon 400 used in a network of balloons may be used to carry a payload that weights between 5 kg and 10 kg. Thus, the balloon 400 must be manufactured to a size that renders the balloon capable of carrying its own structure, in addition to the added 5-10 kg of the payload. Other possible weights may be used as well. Additionally, as described above, the balloon 400 may include a skirt 304 and a bladder 310.

f. Balloon Network with Optical and RF Links Between Balloons

In some embodiments, a high-altitude-balloon network may include super-node balloons, which communicate with one another via optical links, as well as sub-node balloons, which communicate with super-node balloons via RF links. Generally, the optical links between super-node balloons may be configured to have more bandwidth than the RF links between super-node and sub-node balloons. As such, the super-node balloons may function as the backbone of the balloon network, while the sub-nodes may provide sub-networks providing access to the balloon network and/or connecting the balloon network to other networks.

Figure 5:
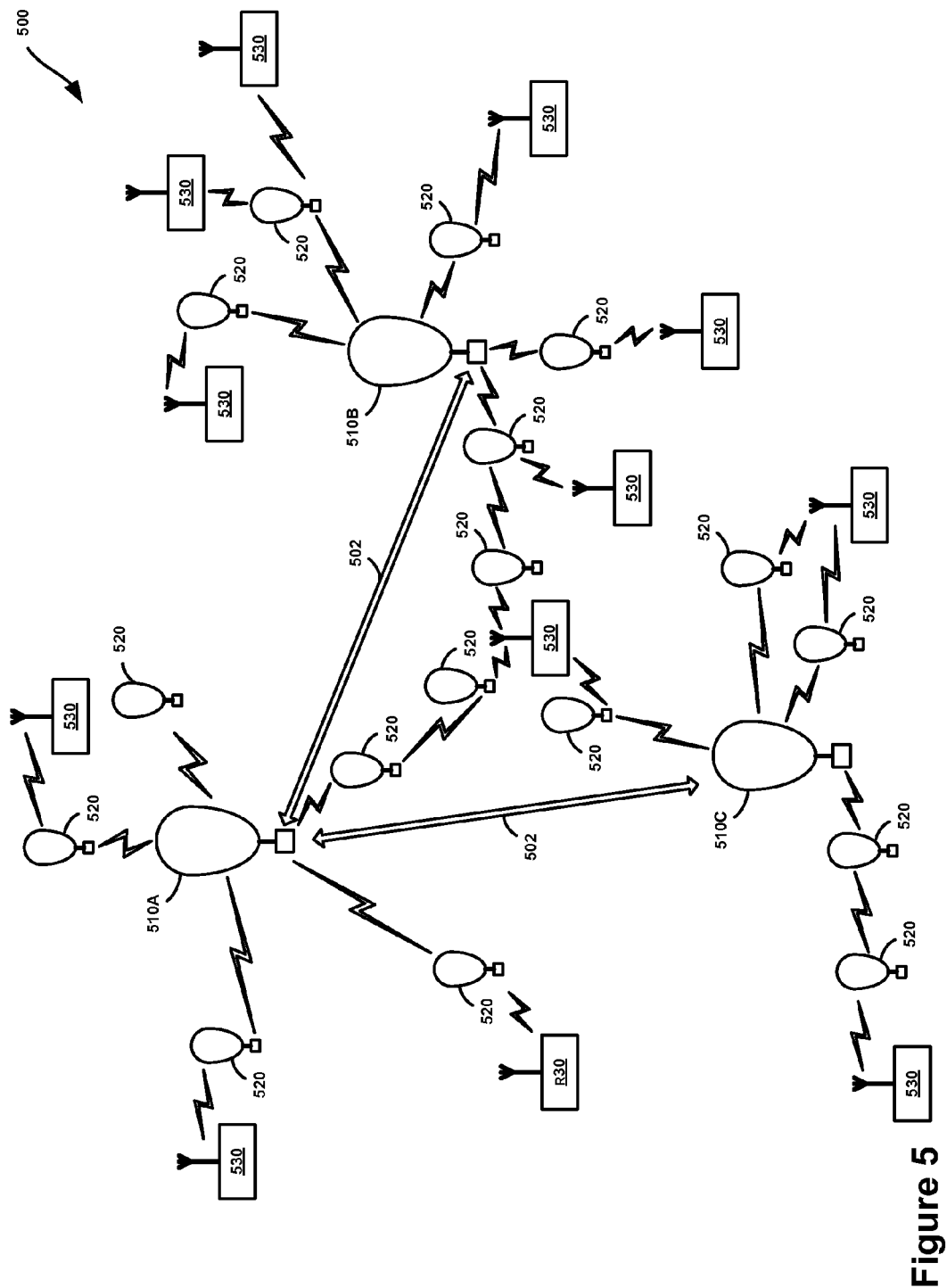
FIG. 5 is a simplified block diagram illustrating a balloon network that includes super-nodes and sub-nodes, according to an example embodiment.

FIG. 5 is a simplified block diagram illustrating a balloon network that includes super-nodes and sub-nodes, according to an example embodiment. More specifically, FIG. 5 illustrates a portion of a balloon network 500 that includes super-node balloons 510A to 510C (which may also be referred to as "super-nodes") and sub-node balloons 520 (which may also be referred to as "sub-nodes").

Each super-node balloon 510A to 510C may include a free-space optical communication system that is operable for packet-data communication with other super-node balloons. As such, super-nodes may communicate with one another over optical links. For example, in the illustrated embodiment, super-node 510A and super-node 501B may communicate with one another over optical link 502, and super-node 510A and super-node 501C may communicate with one another over optical link 504.

Each of the sub-node balloons 520 may include a radio-frequency (RF) communication system that is operable for packet-data communication over one or more RF air interfaces. Accordingly, each super-node balloon 510A to 510C may include an RF communication system that is operable to route packet data to one or more nearby sub-node balloons 520. When a sub-node 520 receives packet data from a super-node 510, the sub-node 520 may use its RF communication system to route the packet data to a ground-based station 530 via an RF air interface.

As noted above, the super-nodes 510A to 510C may be configured for both longer-range optical communication with other super-nodes and shorter-range RF communications with nearby sub-nodes 520. For example, super-nodes 510A to 510C may use high-power or ultra-bright LEDs to transmit optical signals over optical links 502, 504, which may extend for as much as 100 miles, or possibly more. Configured as such, the super-nodes 510A to 510C may be capable of optical communications at data rates of 10 to 50 GBit/sec or more.

A larger number of high-altitude balloons may then be configured as sub-nodes, which may communicate with ground-based Internet nodes at data rates on the order of approximately 10 MBit/sec. For instance, in the illustrated implementation, the sub-nodes 520 may be configured to connect the super-nodes 510 to other networks and/or directly to client devices.

Note that the data speeds and link distances described in the above example and elsewhere herein are provided for illustrative purposes and should not be considered limiting; other data speeds and link distances are possible.

In some embodiments, the super-nodes 510A to 510C may function as a core network, while the sub-nodes 520 function as one or more access networks to the core network. In such an embodiment, some or all of the sub-nodes 520 may also function as gateways to the balloon network 500. Additionally or alternatively, some or all of ground-based stations 530 may function as gateways to the balloon network 500.

I claim:

1. A balloon envelope comprising:
    a plurality of gores, wherein each gore has a hexagonal shape with (i) two elongated edges and (ii) two vertices, each of said gores having a top and a bottom;
    wherein each of said gores is positioned vertically such that the respective vertices of each gore are located at the top and the bottom of the gore, and
    wherein said gores are sealed together at adjacent edges to form cylindrical envelope portion,
    wherein the tops and bottoms of said gores are sealed together at adjacent edges and form hemispheric approximation by triangles, and
    wherein the tops of the gores form a top hemisphere and the bottoms of the gores form a bottom hemisphere, with the cylindrical portion in between the top hemisphere and the bottom hemisphere, when the balloon envelope is inflated to an operational pressure level that is above an ambient pressure level.

2. The balloon envelope of claim 1, wherein said gores are made from a biaxially-oriented polyester.

3. The balloon envelope of claim 1, wherein said gores are sealed by means of heat sealable tape.

4. The balloon envelope of claim 1, wherein said balloon envelope has a predetermined size.

5. The balloon envelope of claim 1, wherein said gores have a predetermined size.

6. The balloon envelope of claim 1, wherein said balloon envelope is filled with a gaseous material.

7. The balloon envelope of claim 6, wherein the gaseous material is helium.

8. The balloon envelope of claim 6, wherein the balloon envelope maintains a constant volume when filled with said gaseous material and exposed to a pressure differential.

9. A balloon envelope comprising:
    a plurality of gores, wherein each gore has a shape with (i) two elongated edges and (ii) two vertices, each of said gores having a top and a bottom;
    wherein each of said gores is positioned vertically such that the respective vertices of each gore are located at the top and the bottom of the gore, and
    wherein said gores are sealed together at adjacent edges to form cylindrical envelope portion,
    wherein the tops and bottoms of said gores are sealed together at adjacent edges and form hemispheric approximation by triangles, and
    wherein the tops of the gores form a top hemisphere and the bottoms of the gores form a bottom hemisphere, with the cylindrical portion in between the top hemisphere and the bottom hemisphere, when the balloon envelope is inflated to an operational pressure level that is above an ambient pressure level.

10. The balloon envelope of claim 9, wherein said gores have a generally hexagonal shape.

11. The balloon envelope of claim 9, wherein said gores are symmetrically shaped.

12. The balloon envelope of claim 9, wherein said gores are sealed by means of heat sealable tape.

* * * * *